United States Patent [19]

Shimizu et al.

[11] Patent Number: 5,296,165
[45] Date of Patent: Mar. 22, 1994

[54] AQUEOUS DISPERSION AND COMPOSITE POWDER OF FLUORINE-CONTAINING POLYMER

[75] Inventors: Tetsuo Shimizu, Osaka; Seitaro Yamaguchi, Minou, both of Japan

[73] Assignee: Daikin Industries, Ltd., Osaka, Japan

[21] Appl. No.: 929,373

[22] Filed: Aug. 14, 1992

Related U.S. Application Data

[63] Continuation of Ser. No. 448,872, Dec. 12, 1989, Pat. No. 5,188,764.

[30] Foreign Application Priority Data

Dec. 12, 1988 [JP] Japan ................... 63-314626

[51] Int. Cl.$^5$ ............... B01J 13/00; B32B 27/00; C08F 14/26
[52] U.S. Cl. ................... 252/311; 252/49.5; 252/610; 264/4.7; 428/402.24; 428/407; 523/201; 524/805
[58] Field of Search .......... 252/308, 311, 610, 49.5; 264/4.7; 428/402.24, 407; 523/201; 524/805, 923

[56] References Cited

U.S. PATENT DOCUMENTS

| | | | |
|---|---|---|---|
| 2,937,156 | 5/1960 | Berry et al. | 524/369 |
| 3,631,141 | 12/1971 | Fang et al. | 524/390 |
| 3,904,575 | 9/1975 | Satokawa et al. | 523/221 |
| 4,129,618 | 12/1978 | Downer et al. | 525/276 |
| 4,469,846 | 9/1984 | Khan et al. | 525/72 |
| 4,692,493 | 9/1987 | Sulzbach et al. | 524/805 X |
| 4,780,490 | 10/1988 | Mizuno et al. | 523/201 |
| 4,929,528 | 5/1990 | Shinoki et al. | 428/407 X |

FOREIGN PATENT DOCUMENTS

| | | |
|---|---|---|
| 0221554 | 5/1987 | European Pat. Off. ............ 523/201 |
| 2949907 | 6/1981 | Fed. Rep. of Germany ...... 523/201 |
| 49-18775 | 5/1974 | Japan . |
| 59-232109 | 12/1984 | Japan . |
| 1364081 | 8/1974 | United Kingdom . |

OTHER PUBLICATIONS

Abstract, JP47031096, Daikin Kogyo Co. Ltd.

*Primary Examiner*—Richard D. Lovering
*Attorney, Agent, or Firm*—Birch, Stewart, Kolasch & Birch

[57] ABSTRACT

An aqueous dispersion comprising composite colloidal particles having an average particle size of 0.05 to 1.0 micrometer each of which comprises a core made of a copolymer comprising 99–100% by weight of tetrafluoroethylene and 0 to 1% by weight of a fluorine-containing olefin which is copolymerizable with tetrafluoroethylene and a shell made of at least one thermoplastic polymer resin selected from the group consisting of ethylene/tetrafluoroethylene base copolymers, ethylene/chlorotrifluoroethylene base copolymers and vinylidene fluoride/hexafluoroisobutene base copolymers, from which composite fluorine-containing polymer particles having good dispersibility in other polymer are prepared and from which an organosol of the composite fluorine-containing polymer particles is formed.

8 Claims, No Drawings

AQUEOUS DISPERSION AND COMPOSITE POWDER OF FLUORINE-CONTAINING POLYMER

This application is a continuation of copending application Ser. No. 07/448,872 filed on Dec. 12, 1989 (now U.S. Pat. No. 5,188,764), the entire contents of which are hereby incorporated by reference.

BACKGROUND OF THE INVENTION

1. Field of the Invention

The present invention relates to an aqueous dispersion, composite powder and an organosol of a fluorine-containing polymer.

2. Description of the Related Art

Organosol

An organosol of polytetrafluoroethylene (hereinafter referred to as "PTFE") is known as a coating material which provides a coating film having good sliding and stainproofing properties and corrosion resistance. It is prepared by adding an organic medium having a boiling point higher 100° C. to an aqueous dispersion comprising colloidal particles PTFE, which in turn is prepared by emulsion polymerization and then removing water from the mixture by heating (an azeotropic method. see Japanese Patent Publication No. 18775/1974).

Since the PTFE colloidal particles prepared by the emulsion polymerization are hardly redispersed once they are coagulated, a large amount of a surfactant is added to the aqueous dispersion to prevent coagulation. To the same end, a copolymer of tetrafluoroethylene (TFE) and hexafluoropropylene (HFP) (this copolymer being referred to as "FEP") which coagulates less than PTFE is used (cf. U.S. Pat. No. 2,937,156, GB Patent No. 1,094,349 and Japanese Patent Publication No. 17548/1973).

To prepare the organosol of PTFE, Japanese Patent Publication No. 17016/1974 discloses a phase transfer method which comprises adding PTFE to a phase transfer agent such as a water-soluble organic solvent or an aqueous solution of an electrolyte, and stirring the mixture to transfer PTFE particles to a phase transfer liquid such as an organic solvent which is insoluble or hardly soluble in water. In this method, the PTFE particles should be mixed to prevent coagulation of the particles.

The coating film prepared from the aqueous dispersion containing a large amount of surfactant tends to suffer from blisters or discoloration. The coating film prepared from the aqueous dispersion comprising FEP has inferior wear resistance so that its sliding property is greatly deteriorated during use.

In general, the colloidal particles of the high molecular weight PTFE having a molecular weight of, for example, about 1,000,000 or larger are easily fibrillated under small shear force, and the fibrils tangle together and cause coagulation. As such, it has been impossible to form an organosol from an aqueous dispersion of colloidal particles of PTFE having a high molecular weight by the phase transfer method or by redispersion of PTFE powder from the aqueous dispersion, which powder is often referred to as fine powder, in the organic solvent.

The formation of an organosol of PTFE particles may be made easy by decreasing of the molecular weight of PTFE to several thousand to several hundred thousand. This is done by using a large amount of a chain transfer agent during polymerization or by irradiation of the fine powder. However, when PTFE is used for lubrication, low molecular PTFE wears heavily.

Blending of PTFE with thermoplastic or thermosetting resins or elastomers

Due to the good properties of PTFE such as heat resistance, flame retardance, non-tackiness, low friction, chemical resistance, low dielectric characteristics and the like, PTFE is used to modify other thermoplastic or thermosetting resins or elastomers through blending. However, PTFE has little compatibility with other resins or elastomers, and PTFE particles are usually not sufficiently dispersed in a molded article of the blend. Thus, for a long time, it has been desired to increase the blending ability of PTFE without deteriorating the good performances of PTFE.

Low molecular weight PTFE which is a so-called "wax" is the most widely used for blending. The PTFE wax can be blended with other polymers to some extent, however, it has insufficient mechanical properties. An aqueous dispersion or powder of high molecular weight PTFE may be used for blending but has poor dispersibility in other polymers so that dispersion in a submicron order can hardly be expected.

To produce a milky molded article of a thermoplastic or thermosetting resin or the elastomer, an inorganic white pigment such as quartz fine powder, alumina hydrate, aluminum hydroxide and calcium carbonate is usually added and mixed in the base polymer. Since the inorganic pigment is harder than the base polymer, it often appears on the surface of molded article and deteriorates the surface smoothness when the pigment and the polymer are simply mixed. To keep the surface smoothness of the molded article, a special technique is required. When the amount of the inorganic pigment increases, the molded article itself becomes harder resulting in a decrease of impact resistance.

Since PTFE powder is white and heat resistant, it is preferred as an organic white pigment which is a substitute for in-organic white pigment. However, as described before, its addition and mixing is difficult.

As composite PTFE colloidal particles, Japanese Patent Kokai Publication No. 232109/1984 discloses composite particles each comprising a core of PTFE and a shell of a fluorine-containing elastomer, and Japanese Patent Kokai Publication No. 109846/1987 discloses composite particles each comprising a core of PTFE and a shell of a copolymer of TFE and chlorotrifluoroethylene (CTFE).

When the shell is made of the fluorine-containing elastomer, the composite particles have poor redispersibility in an aqueous medium or an organic solvent or poor ability to form the organosol. In particular, when blended with other polymers, the sliding property of the molded article is poor.

When the shell is made of the TFE/CTFE copolymer, the particles do not have good two-layer structures, and the molded article made from the blend of such composite particles and other polymer has poor wear resistance.

SUMMARY OF THE INVENTION

One object of the present invention is to provide an aqueous dispersion of composite colloidal particles comprising PTFE, which dispersion is suitable for preparation of an organosol.

Another object of the present invention is to provide a novel composite powder of the fluorine-containing polymer which can be used as a modifier for improving flame retardance, non-tackiness, sliding property, water- and oil-repellence electrical characteristics, soil resistance and weather resistance of the thermoplastic or thermosetting resins and the elastomers or as a white pigment with good dispersibility.

A further object of the present invention is to provide a novel organosol of a fluorine-containing polymer which is suitable to coat articles which are required to have non-tackiness, sliding property, water- and oil-repellence, soil resistance, corrosion resistance and weather resistance.

According to a first aspect of the present invention, there is provided an aqueous dispersion comprising composite colloidal particles having an average particle size of 0.05 to 1.0 micrometer each of which comprises a core made of a copolymer comprising 99–100% by weight of tetrafluoroethylene and 0 to 1% by weight of a fluorine-containing olefin which is copolymerizable with tetrafluoroethylene and a shell made of at least one thermoplastic polymer resin selected from the group consisting of ethylene/tetrafluoroethylene base copolymers, ethylene/chlorotrifluoroethylene base copolymers and vinylidene fluoride/hexafluoroisobutene base copolymers.

According to a second aspect of the present invention, there is provided a fluorine-containing powder which is obtainable by coagulating and drying the aqueous dispersion of the present invention.

According to a third aspect of the present invention, there is provided an organosol composition of a fluorine-containing polymer which is obtainable from the aqueous dispersion of the present invention by the phase transfer method or the azeotropic method or obtainable by dispersing the polymer powder of the present invention in an organic medium.

DETAILED DESCRIPTION OF THE INVENTION

The aqueous dispersion of the colloidal fluorine-containing polymer particles according to the present invention may be prepared by the following process:

In an aqueous medium containing an anionic surfactant which acts as an emulsifier and has substantially no telogen activity, 99 to 100% by weight of TFE and 0 to 1% by weight of other copolymerizable fluoroolefin are polymerized. Then, by changing kinds of monomers or so-called seed polymerization, one of the following thermoplastic resins is polymerized: (a) the ethylene/TFE base copolymer, which has preferably a molar ratio of 2:3 to 3:2 of ethylene:TFE and optionally comprises at least one fluorine-containing olefin in an amount of not more than 15% by mole based on the total mole of ethylene and TFE, (b) the ethylene/CTFE base copolymer, which has preferably a molar ratio of 2:3 to 3:2 of ethylene:CTFE and optionally comprises at least one fluorine-containing olefin in an amount of not more than 10% by mole based on the total mole of ethylene and CTFE, and (c) the vinylidene fluoride (VdF)/hexafluoroisobutene (HFiB) base copolymer, which has preferably a molar ratio of 9:1 to 1:1 of VdF:HFiB and optionally comprises at least one fluorine-containing olefins in an amount of not more than 30% by mole based on the total mole of VdF and HFiB.

The first polymerization step for preparing the core is carried out according to an emulsion polymerization procedure which is conventional n the TFE polymerization. For example, under the reaction conditions such as the reaction pressure of from 6 to 40 kg/cm$^2$ and the reaction temperature of from 10° to 120° C., TFE and optionally the other copolymerizable olefin are polymerized in the presence of a polymerization initiator in an aqueous medium containing a water-soluble fluorine-containing dispersant.

Examples of the polymerization initiator are water-soluble organic or inorganic peroxides or their combination with a reducing agent.

Examples of the water-soluble fluorine-containing dispersant are compounds of the formula:

$$C_nF_{2n+1}COOX$$

or $$C_3F_7O[CF(CF_3)CF_2O]_mCF(CF_3)COOX$$

wherein n is an integer of 6 to 9, m is 1 or 2 and X is NH$_4$ of an alkali metal. Such the dispersant is used in an amount of 0.03 to 1% by weight based on the weight of the aqueous medium.

Specific examples of the other fluorine-containing olefin are a compound of the formula:

$$Y(CF_2)_xO_yCZ=CF_2$$

wherein Y is a hydrogen atom, a chlorine atom or a fluorine atom, Z is a hydrogen atom or fluorine atom, x is an integer of 1 to 6 and y is 0 or 1, a compound of the formula:

$$C_3F_7O[CF(CF_3)CF_2O]_z-CF=CF_2$$

wherein z is 1 or 2, CTFE, VdF and trifluoroethylene (TrFE).

The PTFE prepared in this step preferably has a molecular weight of at least 1,000,000. When the molecular weight is smaller, the wear resistance of the coating film tends to decrease. The molecular weight can be controlled by adjusting the amount of the polymerization initiator or the reaction temperature. The waxy low molecular weight PTFE has a molecular weight of several thousand to several hundred thousand. In some special cases, the molecular weight of PTFE may be decreased by the addition of hydrocarbons or halogenated hydrocarbons (e.g. methane, chloromethane, 1,1-dichloroethane, etc.) as chain transfer agents.

When the amount of PTFE prepared in the first polymerization step is small, the finally prepared composite particles have a comparatively small particle size so that the dispersibility during polymerization is improved.

In the second polymerization step, the kinds of monomers are changed, and if desired, the additional polymerization initiator is added to further proceed the polymerization, or at least a part of the aqueous dispersion obtained in the first polymerization step is taken in a new reaction vessel and thereto the water-soluble fluorine-containing dispersant, the polymerization initiator and the like are added to restart the polymerization.

The reaction pressure in the second step may be higher than in the first step to accelerate the polymerization and preferably from 6 to 60 kg/cm$^2$. The reaction temperature is not necessarily the same as that in the first polymerization step and selected from the range from about 10° to 120° C. according to the composition or the physical properties of the polymer in the shell.

Specific examples of the other fluorine-containing olefin copolymerizable with ethylene and TFE are an olefin of the formula:

$$R_f\text{—CF}=CF_2$$

wherein $R_f$ is a perfluoroalkyl group having 1 to 10 carbon atoms, preferably 1 to 5 carbon atoms, an olefin of the formula:

$$C_aF_{2a+1}\text{—O—}[CF(CF_3)CF_2O]_p\text{—CF}=CF_2$$

wherein a is an integer of 1 to 5 and p is 1 or 2, an olefin of the formula:

$$Y(C_bF_{2b})\text{—CY'}=CH_2$$

wherein Y is the same as defined above, Y' is a fluorine atom or a chlorine atom and b is an integer of 1 to 10, preferably 1 to 6, HFiB, VdF, TrFE, CTFE and the like. The amount of the other olefin does not exceed 15% by mole.

Specific examples of the other fluorine-containing olefin copolymerizable with ethylene and CTFE are an olefin of the formula:

$$R_f\text{—CF}=CF_2$$

wherein $R_f$ is the same as defined above, an olefin of the formula:

$$C_aF_{2a+1}\text{—O—}[CF(CF_3)CF_2O]_p\text{—CF}=CF_2$$

wherein a and p are the same as defined above, an olefin of the formula:

$$Y(C_bF_{2b})\text{—CY'}=CH_2$$

wherein Y, Y' and b are the same as defined above, HFiB, VdF, TrFE and the like. The amount of the other olefin does not exceed 10% by mole.

Specific examples of the other fluorine-containing olefin copolymerizable with VdF and HFiB are TFE, CTFE and the like. The amount of the other olefin does not exceed 30% by mole.

In one or both of the polymerization steps, as the dispersion stabilizer for the colloidal particles, a hydrocarbon or halogenated hydrocarbon which is liquid at the polymerization temperature, insoluble in water and inactive to the polymerization reaction can be added to the reaction system.

The prepared colloidal particles of the fluorine-containing polymer is deemed to have a core-shell two layer structure. The weight ratio of the core to the shell is from 96:4 to 30:70, preferably from 93:7 to 40:60.

When the particles are used as a white pigment, it is possible to reduce the weight ratio of the core. To redisperse the particles in the aqueous medium or the organic medium or to prepare the organosol, the weight of the shell should be at least 4% by weight based on the weight of the particle.

When the weight of the core is too small, the coating film prepared from the organosol has deteriorated wear resistance and sliding property, or the particles cannot impart good sliding property to the thermoplastic or thermosetting resins or the elastomers in which the particles are blended.

The above weight ratio of the core to the shell is based on the assumption that the core and the shell have a clear boundary between them. The core and the shell do not necessarily have a clear boundary. When the shell polymer contains TFE like the ethylene/TFE copolymer, the monomer composition may be continuously changed from the core to the shell.

The composite colloidal particles of the fluorine-containing polymer according to the present invention has an average particle size of 0.05 to 1 μm, preferably 0.1 to 0.5 μm. The particle size of the colloidal particles can be controlled by the conventional methods employed in the emulsion polymerization of TFE. The average particle size of the colloidal particles greatly influences the aqueous or organic dispersion composition.

The solid content of the finally produced aqueous dispersion of the fluorine-containing polymer according to the present invention is usually from 10 to 50% by weight, preferably from 20 to 40% by weight based on the weight of the aqueous medium.

The organosol composition of the present invention can be prepared from the aqueous dispersion of the fluorine-containing polymer according to the present invention by the following procedures.

Preparation of Organosol Composition by the Phase Transfer Method (1) Per 100 parts by weight of the fluorine-containing polymer in the aqueous dispersion, 50 to 500 parts by weight, preferably 100 to 200 parts by weight of an organic compound which is insoluble or hardly soluble in water and in the liquid state around room temperature (a phase transfer liquid) is added to the aqueous dispersion, and the mixture is gently stirred.

(2) To the mixture, an aqueous solution of an electrolyte or an organic compound which can be dissolved in water in any ratio (a phase transfer agent) is added in an amount of 50 to 2000 parts by weight, preferably 250 to 1000 parts by weight per 100 parts by weight of the fluorine-containing polymer. The mixture is gently stirred and then kept standing.

(3) Since the fluorine-containing polymer is precipitated together with the phase transfer liquid, the upper layer comprising water is removed. To the precipitated layer comprising the fluorine-containing polymer and a small amount of water, an organic medium is added.

(4) The mixture obtained in the previous step (3) is heated around 100° C. while stirring to evaporate water off to decrease the water content to less than the standard value, which is 5000 ppm or less in the below described Preparation Examples.

(5) If desired, a film-forming material which will be explained is added.

Specific examples of the phase transfer liquid are hexane, heptane, octane, benzene, toluene, methyl isobutyl ketone and the like.

Specific examples of the electrolyte in the phase transfer agent are salts of alkali metals or alkaline earth metals such as sodium sulfate, magnesium chloride, sodium nitrate, potassium acetate and the like. The electrolyte is used in the form of an aqueous solution having a concentration of 0.01 to 50% by weight, preferably 0.1 to 10% by weight.

Specific examples of the organic compound as the phase transfer agent are organic liquids which are liquids at room temperature and have boiling points not higher than 200° C. such as acetone, methanol and the like.

The organic medium used in the step (3) means an organic liquid which is insoluble or hardly soluble in water and evaporates azeotropically with water. Examples of such organic liquid are aromatic hydrocarbons (e.g. benzene, toluene and xylene) and ketones (e.g. methyl isobutyl ketone and diisobutyl ketone). Among them, toluene and methyl isobutyl ketone are preferred from the economical view point.

Preparation of Organosol Composition from Powder of Fluorine-Containing Polymer

According to the method disclosed in U.S. Pat. No. 2,593,583, the organosol composition of the present invention can be prepared by coagulating the fluorine-containing polymer from the aqueous dispersion of the present invention with a coagulating agent by a conventional method, drying the coagulated fluorine-containing polymer at a temperature lower than the melting point of the polymer which forms the shell and dispersing the dried powder in the organic solvent by mechanical stirring or with the application of ultrasonic wave.

Specific examples of the coagulating agent are conventionally used inorganic acids or bases, water-soluble inorganic salts, organic solvents and the like.

Insofar as the organic solvent can wet the surfaces of the fluorine-containing polymer particles, the organosol can be formed.

To the organosol composition of the present invention, a film-forming agent comprising the thermoplastic or thermosetting polymer is preferably added to increase the strength of the coating film prepared from the organosol composition.

Specific examples of the film-forming agent are nitrocellulose, cellulose acetate butyrate, alkid polymers, polyesters, polyurethanes, phenol/formaldehyde polymers, urea/formaldehyde polymers, melamine/formaldehyde polymers, epoxy polymers, polyimides, polyamides, polyamideimides, polyethersulfones, polyphenylenesulfides, silicone polymers, etc. Also, a combination of a carboxylic dianhydride and a dianiline from which the polyimide is obtained can be used. Examples of the acid dianhydride are pyromellitic dianhydride, benzophenonetetracarboxylic dianhydride, etc, and examples of the dianiline are oxydianiline, methylenedianiline, etc. Among them, polyimides, polyamides and polyamideimides are preferred because of good strength of the coating film.

The weight ratio of the composite fluorine-containing polymer particles of the present invention to the organic medium in the organosol composition is usually from 5:95 to 50:50, preferably from 20:80 to 40;60.

When the film-forming material is used, the weight ratio of the composited fluorine-containing polymer particles to the film-forming material is usually from 5:95 to 90:10, preferably from 30:70 to 70:30.

The organosol composition as such or its mixture with the film-forming material can be used as a non-aqueous coating.

The aqueous dispersion of the present invention as such, a concentrated liquid prepared from a mixture of the aqueous dispersion and a stabilizer such as a non-ionic surfactant or the aqueous dispersion to which an organic or inorganic filler or an aqueous dispersion of other fluorine-containing polymer is added can be used as a water-base coating.

The non-aqueous coating or the water-base coating can be applied to various materials. For example, it can be impregnated in organic or inorganic woven or non-woven fabrics or coated on metals such as aluminum or iron, or ceramics by spray coating, brush coating or dip coating. The materials to be coated include various industrial or domestic articles such as cooking utensiles, boilers, molds, tent materials, rollers, pistons and bearings.

Since the organosol composition of the present invention contains the composite fluorine-containing polymer colloidal particles, the sliding properties of the coated materials are considerably improved. When the surface of coating film is abrased, the sliding properties are further improved, since the PTFE in the cores appears on the surface of the coating film and its inherent low friction characteristics can be used on the surface. Such the effect can be achieved by the composite colloidal particles having the core-shell structure but cannot be achieved with a simple colloidal particles consisting of the same polymer as the core polymer of the present invention.

The copolymer which forms the shell is a comparatively hard copolymer among the fluorine-containing polymers. Japanese Patent Kokai Publication No. 109846/1987 discloses composite particles consisting of the core made of PTFE and the shell made of the TFE/CTFE copolymer. But, the core-shell two-layer structure is not sufficiently formed, so that the wear resistance of the coating film is inferior to the present invention. This is because the TFE/CTFE copolymer is softer than the copolymer which forms the shell according to the present invention. For the same reason, the coating film from an organosol composition comprising a TFE base polymer has inferior wear resistance to the present invention.

Besides the organosol component, the fluorine-containing polymer powder of the present invention can be used as a white pigment or a modifier which improves flame-retardance, non-tackiness, sliding properties, water- and oil-repellence, electrical characteristics, soil resistance, corrosion resistance and weather resistance of the thermoplastic or thermosetting resins or the elastomers.

The fluorine-containing polymer powder of the present invention can be blended as the white pigment in homo- or co-polymers of methacrylates, acrylates or styrene which are colorless and transparent. Alternatively, the fluorine-containing polymer powder can be added as the modifier for engineering plastics such as polyacetal, polycarbonate, polyetheretherketone, whole aromatic polyester, polyethylene terephthalate, polyphenylene sulfide, polyamide, polyphenylene oxide, polybutylene terephthalate, polysulfone, polyethersulfone, polyimide and the like. The fluorine-containing polymer particles of the present invention has better blending properties than the conventional PTFE particles.

The fluorine-containing polymer particles of the present invention are most suitably blended with the polymer which is the same as the shell forming polymer. In general, although the VdF/HFiB copolymer is brittle, the blending of the fluorine-containing polymer particles of the present invention can improve the brittleness of the VdF/HFiB copolymer.

PREFERRED EMBODIMENTS OF THE INVENTION

The present invention will be illustrated in detail by following Examples, in which "parts" are by weight unless otherwise indicated.

EXAMPLE 1

Preparation of Aqueous Dispersion

In a stainless steel made 3 liter autoclave equipped with an anchor agitator, baffle plates and a thermometer, deoxygenated deionized water (1.45 l), a liquid paraffin (90 g) and ammonium perfluorooctanoate (1.5 g) were charged and heated to 70° C. The interior gas of the autoclave was purged with nitrogen three times and then with TFE twice.

To the content in the autoclave, HFP (0.2 g) was added and TFE was injected to raise the internal pressure to 10 kgf/cm$^2$. To the mixture, a solution of ammonium persulfate (APS) (80 mg) in water (50 ml) was added while stirring to start polymerization. During polymerization, the reaction mixture was stirred at 280 rpm and kept at 70° C. while continuously supplying TFE in the autoclave so as to keep the internal pressure at 10 kgf/cm$^2$. As soon as 390 g of TFE was consumed (after about 4.0 hours), the stirring and supply of TFE were stopped and TFE was discharged till the internal pressure decreased to 3.0 kgf/cm$^2$. Then, a mixture of 48% by mole of TFE and the rest of ethylene was supplied in the autoclave to raise the internal pressure to 10 kgf/cm$^2$ and the stirring was restarted. The polymerization was continued while keeping the pressure at 10 kgf/cm$^2$. When 37 g of the mixture of TFE and ethylene was consumed (after about 12 hours from the change of monomer kinds), the polymerization reaction was terminated and the unreacted monomers were discharged from the autoclave. During polymerization, the concentration of ethylene was 22 to 30% by mole.

The colloidal particles of the copolymer in the obtained aqueous dispersion was analyzed with a laser beam scattering particle size analyzer system (LPA-3000 manufactured by Otsuka Electronics) to find that the number average particle size was 0.19 μm and the particle size distribution was monodisperse. The solid content in the aqueous dispersion was 22.0% by weight.

The solid recovered by evaporation to dryness of the aqueous dispersion was subjected to the thermogravimetric analysis. Thermal decomposition starting temperatures were observed at about 339° C. which might be attributed to the ethylene/TFE copolymer forming the shell and at about 469° C. which might be attributed to PTFE forming the core, and the weight ratio of the former to the latter was about 9:91, which ratio substantially corresponds to the weight ratio calculated from the consumed amounts of the monomers.

Redispersibility of Polymer Powder

A part of the obtained aqueous dispersion was charged in a vessel equipped with a high speed agitator. Ammonium carbonate was added and stirred at room temperature to coagulate the copolymer particles followed by drying at 120° C. The dried particles were dispersed in each of toluene, methyl isobutyl ketone, ethanol, trichlorotrifluoroethane and a 5% aqueous solution of a commercially available nonionic surfactant (Triton X-100) while applying ultrasonic wave. The particles were easily redispersed.

Preparation of Organosol by the Phase Transfer Method

To the obtained aqueous dispersion (each 385 parts), n-hexane (125 parts) as the phase transfer liquid. To the mixture, acetone (275 parts) as the phase transfer agent was added while stirring. After stirring for further 5 minutes, the mixture was kept standing, and the supernatant was discarded. To the residual precipitate, methyl isobutyl ketone (300 parts) was added and heated to about 100° C. while stirring to remove water contained in the precipitate. Thereby, the organosol having the solid content of 30% by weight (333 parts) was obtained. The organosol contained about 0.2% by weight of water measured by the Karl Fischer's method.

EXAMPLE 2

Preparation of Aqueous Dispersion

The polymerization was carried out in the same manner as in Example 1 except that after the consumption of 390 g of TFE (about 4.5 hours), the supply of TFE and stirring were immediately stopped and substantially all TFE was discharged, then HFiB (58 g) was injected with VdF in place of the monomer mixture of TFE and ethylene to raise the internal pressure to 10 kgf/cm$^2$ and stirring was restarted, and the polymerization was continued while keeping said pressure. When 23 g of VdF was consumed (after 12 hours from the change of monomer kinds), the stirring was stopped and the gas in the autoclave was discharged to terminate the reaction.

The average particle size of the fluorine-containing polymer particles in the obtained aqueous dispersion was 0.17 μm, and the particle size distribution was monodisperse. The solid content in the aqueous dispersion was 23.5% by weight.

The weight ratio of the HFiB/VdF copolymer of the shell based on the whole weight of the particles was 10.1% by weight. Such ratio was calculated from the absorbance at 1450 cm$^{-1}$ in the IR spectrum measured on a film which was prepared by heat pressing the polymer powder at 350° C. by making reference to a calibration line which was obtained by measuring the absorbance at 1450 cm$^{-1}$ on films prepared from mixtures of the HFiB/VdF copolymer powder and the PTFE powder in various weight ratios.

Redispersibility of the Powder and Preparation of Organosol

The powder was redispersed and the organosol was prepared in the same manners as in Example 1 without problems.

EXAMPLE 3

In the same manner as in Example 1 but using no HFP, the aqueous dispersion of polymer particles was prepared.

The average particle size of the fluorine-containing polymer particles in the obtained aqueous dispersion was 0.20 μm, and the particle size distribution was mono-disperse. The solid content in the aqueous dispersion was 23.0% by weight.

The weight ratio of the core to the shell was 91:9.

The powder was redispersed and the organosol was prepared in the same manners as in Example 1 without difficulties.

COMPARATIVE EXAMPLE 1

In the same autoclave as used in Example 1, the same amounts of deoxygenated deionized water and liquid paraffin and 1.5 g of ammonium perfluorooctanoate were charged and heated to 70° C. The interior gas of the autoclave was purged with nitrogen three times and then with a mixture of 18% by mole of TFE and the rest of ethylene twice.

The same monomer mixture was injected in the autoclave to raise the internal pressure to 8.5 kgf/cm² and the polymerization was effected for 72 hours while stirring with continuously supplying the same monomer mixture to keep the same internal pressure to obtain an aqueous dispersion of ethylene/TFE copolymer particles having the solid content of 8.2% by weight and the average particle size of 0.14 μm.

In the same manners as in Example 1, the powder was redispersed and the orgnosol was prepared by the phase transfer method without difficulties.

COMPARATIVE EXAMPLE 2

In the same autoclave as used in Example 1, the same amount of deoxygenated deionized water and 10.4 g of ammonium perfluorooctanoate were charged and heated to 70° C. The interior gas of the autoclave was purged with nitrogen three times and with VdF twice.

Then, 443 g of HFiB was charged with the VdF gas and the internal pressure was raised to 33.4 kgf/cm² by injecting the VdF gas (221 g). Thereafter, the polymerization was effected for 225 hours while stirring to obtain an aqueous dispersion of HFiB/VdF copolymer particles having the solid content of 24.3% by weight and the average particle size of 0.13 μm. At the end of polymerization, the pressure of VdF was 23 kgf/cm².

In the same manners as in Example 1, the powder was redispersed and the orgnosol was prepared by the phase transfer method without difficulties.

COMPARATIVE EXAMPLE 3

In the same manner as described in Preparation Example 1 of U.S. Pat. No. 4,780,490 which corresponds to Japanese Patent Kokai Publication No. 109846/1987, an aqueous dispersion having the solid content of 26.0% by weight was obtained. The produced polymer particles consisted of the core made of HFP-modified PTFE and the shell made of the CTFE/TFE copolymer. The content of CTFE in the whole particles was 4.0% by weight, and the content of CTFE in the shell parts was 8.8% by weight. From these contents, the weight ratio of the shell to the core was 45:55. The particles had the average particle size of 0.21 μm.

The powder could be redispersed in the same manner as in Example 1 although it took more time than in Example 1. The orgnosol could be prepared by the phase transfer method as in Example 1.

COMPARATIVE EXAMPLE 4

By the first step of Example 1, an aqueous dispersion was prepared. The powder obtained by coagulation and drying could not be redispersed. In the phase transfer method, all the polymer particles were coagulated and no organosol was obtained.

COMPARATIVE EXAMPLE 5

The aqueous dispersions prepared in Comparative Examples 1 and 4 were mixed in the weight ratio of 4:1. Then, it was tried to redisperse the polymer powder or to form the organosol. But the results were the same as in Comparative Example 4.

EXPERIMENTS 1, 2 AND 3

To each of the organosol compositions prepared by the phase transfer method in Examples 1, 2 and 3 (each 333 parts), polyamideimide (HI-610 manufactured by Hitachi Chemical Co., Ltd.) (370 parts), carbon (Carbon Neospectra Mark IV manufactured by Columbia Carbon Co., Ltd.) (6 parts) and N-methyl-2-pyrrolidone (272 parts) were added and mixed in a ball mill at 80 rpm at 20° C. for 48 hours.

The mixture was filtered through a 150 mesh net. The viscosity of the filtrate was 270 seconds measured by the Ford Cup No. 4.

The mixture was spray coated on a surface of a degreased aluminum plate with a spray gun having a nozzle diameter of 0.8 mm under pressure of 3 kg/cm². Then, the coated aluminum plate was dried in an IR heater kept at 80° C. for 30 minutes and baked in an electric furnace kept at 200° C. for 30 minutes to prepare a sample plate coated with the test coating film.

With the prepared coating film, the film thickness and Taber abrasion loss were measured. Before and after the Taber abrasion test, the sliding property (coefficient of friction) was measured.

The film thickness was measured with a high frequency thickness meter (Type ES 8e 3KB4 manufactured by Kett Science Laboratory).

With a Taber type abrasion tester (abrasion disc: CS No. 17, load: 1 kg, 1000 rpm), an abrased amount (mg) after 1000 revolutions was measured.

The coefficient of friction was measured with a Bauden-Leben type friction coefficient meter (8 mm steel ball, load: 1 kg, rate: 0.23 cm/sec.).

The results are shown in Table.

COMPARATIVE EXPERIMENTS 1, 2 AND 3

In the same manner as in Experiments 1, 2 and 3 but using each of the organosols prepared in Comparative Examples 1, 2 and 3, the same experiments were done.

The results are shown in Table.

TABLE

| Experiment No. | Film thickness (μm) | Taber abrasion loss (mg) | Coefficient of friction (before abrasion/ after abrasion) |
| --- | --- | --- | --- |
| 1 | 40–50 | 3.0 | 0.06/0.05 |
| 2 | 40–50 | 5.0 | 0.05/0.04 |
| 3 | 40–50 | 2.7 | 0.05/0.05 |
| Comp. 1 | 40–50 | 11.5 | 0.07/0.24 |
| Comp. 2 | 40–50 | 31.5 | 0.06/0.34 |
| Comp. 3 | 40–50 | 7.0 | 0.07/0.06 |

What is claimed is:

1. An aqueous dispersion comprising composite fluorine-containing colloidal particles having an average particle size of 0.05 to 1.0 micrometer, each of which particle comprises a core made of a copolymer comprising 99–100% by weight of tetrafluoroethylene and 0 to 1% by weight of a fluorine-containing olefin which is copolymerizable with tetrafluoroethylene and a shell made of at least one thermoplastic polymer resin selected from the group consisting of ethylene/tetrafluoroethylene base copolymers, ethylene/chlorotrifluoroethylene base copolymers and vinylidene fluoride/hexafluoroisobutene base copolymers.

2. The aqueous dispersion according to claim 1, wherein the weight ratio of the core to the shell of the fluorine-colloidal colloidal particles is from 96:4 to 30:70.

3. The aqueous dispersion according to claim 1, wherein the fluorine-containing olefin which is copolymerizable with tetrafluoroethylene in the core is at least one selected from the group consisting of:

$$Y(CF_2)_xO_yCZ{=}CF_2$$

wherein Y is a hydrogen atom, a chlorine atom or a fluorine atom, Z is a hydrogen atom or fluorine atom, x is an integer of 1 to 6 and y is 0 or 1, and a compound of the formula:

$$C_3F_7O[CF(CF_3)CF_2O]_z{-}CF{=}CF_2$$

wherein z is 1 or 2, chlorotrifluoroethylene, vinylidene fluoride and trifluoroethylene.

4. The aqueous dispersion according to claim 3, wherein the fluorine-containing olefin which is copolymerizable with tetrafluoroethylene in the core is $CF_2{=}CFI$, $CF_2{=}CFCF_3$ OR $C_3F_7OCF{=}CF_2$.

5. The aqueous dispersion according to claim 1, wherein the shell consists of the ethylene/tetrafluoroethylene copolymer having a weight ratio of ethylene to tetrafluoroethylene of 2:3 to 3:2 and said copolymer contains at least one other fluorine-containing olefin, which is copolymerizable with ethylene and tetrafluoroethylene, in an amount of not more than 15% by weight based on the total weight of ethylene and tetrafluoroethylene.

6. The aqueous dispersion according to claim 1, wherein the shell consists of the ethylene/chlorotrifluoroethylene copolymer having a weight ratio of ethylene to tetrafluoroethylene of 2:3 to 3:2 and said copolymer contains at least one other fluorine-containing olefin, which is copolymerizable with ethylene and chlorotrifluoroethylene, in an amount of not more than 10% by weight based on the total weight of ethylene and tetrafluoroethylene.

7. The aqueous dispersion according to claim 1, wherein the shell consists of the vinylidene fluoride/hexafluoroisobutene copolymer having a weight ratio of ethylene to tetrafluoroethylene of 2:3 to 3:2 and said copolymer contains at least one other fluorine-containing olefin, which is copolymerizable with vinylidene fluoride and hexafluoroisobutene, in an amount of not more than 30% by weight based on the total weight of vinylidene fluoride and hexafluoroisobutene.

8. A fluorine-containing powder which is obtained by coagulating and drying the aqueous dispersion according to claim 1.

* * * * *